United States Patent [19]

Peters et al.

[11] 3,979,212

[45] Sept. 7, 1976

[54] LAMINATED LITHOGRAPHIC PRINTING PLATE

[75] Inventors: John E. Peters; Vincent A. Pagliaro, both of Racine, Wis.

[73] Assignee: Printing Developments, Inc., New York, N.Y.

[22] Filed: Oct. 4, 1974

[21] Appl. No.: 512,002

[52] U.S. Cl. ................................. 96/86 R; 101/459
[51] Int. Cl.² ........................................ G03C 1/94
[58] Field of Search ............... 96/86 R, 33; 101/458, 101/459

[56] References Cited
UNITED STATES PATENTS

| | | | |
|---|---|---|---|
| 2,181,111 | 11/1939 | Horn | 101/458 |
| 2,291,854 | 8/1942 | Whyzmuzis | 96/86 R X |
| 3,201,239 | 8/1965 | Neugebauer | 96/33 X |
| 3,556,952 | 1/1971 | Fry et al. | 101/458 X |
| 3,577,920 | 5/1971 | London et al. | 96/86 R UX |
| 3,839,037 | 10/1974 | Fromson | 96/86 R X |
| 3,865,595 | 2/1975 | Watkinson | 101/458 X |

FOREIGN PATENTS OR APPLICATIONS

| | | | |
|---|---|---|---|
| 2,012,288 | 10/1971 | Germany | 101/459 |
| 936,913 | 9/1963 | United Kingdom | 96/86 R |

*Primary Examiner*—David A. Simmons
*Attorney, Agent, or Firm*—Brumbaugh, Graves, Donohue & Raymond

[57] ABSTRACT

An inexpensive, strong, durable noncracking, high fidelity lithographic printing plate comprises a soft temper aluminum sheet laminated to a nonstainless steel sheet with an adhesive. If desired, the aluminum sheet can be plated with either copper or chromium and the copper in turn can be plated with chromium.

9 Claims, No Drawings

LAMINATED LITHOGRAPHIC PRINTING PLATE

The present invention relates to a laminated lithographic printing plate which:
1. has the fidelity of reproduction obtainable from copper-aluminum bimetallic lithographic printing plates;
2. has the strength and endurance of stainless steel lithographic printing plates; and
3. performs on press with the combined advantages of both stainless steel and aluminum lithographic printing plates.

Most present day lithographic printing plates are either aluminum based or stainless steel based substrates. The aluminum lithographic printing plates produce excellent reproductions and perform well on press because of the hydrophilic nature of aluminum. However, these aluminum lithographic printing plates have a tendency to crack at the gripper bends and therefore either fail on press or cannot be repeatedly reused. The only presently known method for minimizing the tendency for aluminum lithographic printing plates to crack requires meticulous dimensional conformation of the plate to its backup cylinder. Nothing has been found to enable aluminum lithographic printing plates to be repeatedly taken off and put back on press.

Stainless steel lithographic printing plates, on the other hand, have the strength and durability to be continuously removed and reinstalled for reruns or left on for long press runs without cracking like aluminum lithographic printing plates. However, stainless steel lithographic printing plates are not as hydrophilic as aluminum plates. Moreover, stainless steel is very expensive.

The object of the present invention is to achieve the benefits of both aluminum and stainless steel systems while eliminating their disadvantages. In this way, the physical limitations of aluminum and the inferior lithographic qualities and high cost of stainless steel are jointly overcome.

This can be accomplished in accordance with the present invention in two ways:
1. Laminate the aluminum sheet to the steel sheet and, if desired, then plate with copper and/or chromium.
2. Plate the aluminum sheet with copper and/or chromium, if desired, and then laminate it to the steel sheet.

The laminated lithographic printing plate is thereafter processed further with well known presensitized or photosensitive coatings, including photosensitive resist coatings in the case of the placed laminated, such as those disclosed in U.S. Pat. Nos. 3,615,538 and 3,201,239.

The aluminum sheet is a soft temper aluminum, i.e., having a temper of 0 to ¼ hardness, in order to prevent cracking at the bends on the bending jig. The steel sheet is a nonstainless steel, i.e., a steel other than stainless steel, in order to provide an inexpensive laminated lithographic printing plate. The adhesive can be any conventional adhesive used in the laminating of nonporous materials. Representative examples thereof include protein-based adhesives, such as animal glue, blood glue, casein glue, fish glue and soybean glue; rubber-based adhesives, such as butadiene-acrylonitrile rubber, polybutadiene rubber, butyl rubber, natural rubber, polyurethane rubber and silicone rubber; thermoplastic adhesives, such as cellulose acetate, methyl cellulose, polyesters, polystyrene, polyvinyl alcohol, polyvinyl chloride, and vinyl acetate-ethylene copolymer; and thermosetting adhesives, such as polyesters, polyisocyanates, polyurethanes, urea-formaldehyde resins, epoxy resins, furan resins, phenol-formaldehyde resins and silicone resins.

The conditions for lamination, such as thickness, viscosity, time, temperature and pressure, will vary with the adhesive selected.

Typical laminated lithographic printing plates of this invention, which are photosensitized, developed, etched (in the case of plated laminates) and used in the conventional manner, as well as representative methods of their preparation are illustrated by the following examples.

EXAMPLE 1

A soft temper aluminum sheet in coil form 0.003 inch thick was electroplated with copper using a copper cyanide plating bath at 160°F.–180°F., 4–8 volts, 30–50 amps/ft.$^2$ to obtain a copper thickness of approximately 100 micro inches. The copper plated aluminum sheet was laminated to a 0.008 inch thick medium temper plain, carbon steel sheet in coil form by applying a thermosetting polyester resin adhesive (DuPont 46960) to either one of the sheets, passing the adhesive coated sheet through a drying oven to remove solvents and contacting the dried adhesive coated sheet with the other sheet through a steam heated nip at a temperature of 150°F.–200°F. and a nip pressure of approximately 10–20 psi. The resultant laminated lithographic printing plate of nominal 0.012 inch thickness had an adhesive film thickness of 0.0005–0.0010 inch whose bond peel strength exceeded 10 lbs./inch when subjected to delamination testing.

EXAMPLE 2

Same processing as in Example 1, except a 0.006 inch thick soft temper aluminum sheet was used resulting in a nominal 0.015 inch thick laminated lithographic printing plate.

EXAMPLE 3

Aluminum and steel sheets of the same parameters as in Examples 1 and 2 were laminated first, as described. The laminated sheets were then electroplated with copper, as also described.

EXAMPLE 4

In order to make positive working laminated lithographic printing plates, the plates prepared as in Examples 1, 2 and 3 were electroplated with chromium after copper plating using a chromic acid plating bath at 110°F.–130°F., 6–10 volts, 400–600 amps/ft.$^2$ to obtain a chromium thickness of approximately 50 micro inches.

EXAMPLE 5

Lithographic plates prepared as in Examples 1, 2, 3 and 4 were presensitized by the application of conventional positive or negative light-sensitive coatings via a conventional coating method, such as whirler, roller coater, meniscus, myer rod and dip coater.

The laminated, but unplated, plates of the invention can also be used as a substrate for surface type lithographic printing plates where printing is made from the developed photosensitized coating rather than from the etched plating.

The laminated lithographic printing plates of the invention have been placed on printing presses of the type (both web-fed and sheet-fed) which were never able to run aluminum based printing plates successfully before, and these plates have run successfully to completion of the printing job without failing due to cracking.

Various modifications and changes may be made in the laminated lithographic printing plates of the invention by those skilled in the graphic arts, in addition to those mentioned above, without departing from the essence of the invention and accordingly the invention is to be limited only within the scope of the appended claims.

What is claimed is:

1. An inexpensive, strong, durable, noncracking, high fidelity lithographic printing plate which comprises a laminated base or substrate formed of a soft temper aluminum sheet laminated to a nonstainless steel sheet with an adhesive.

2. The lithographic printing plate as defined by claim 1 wherein the aluminum sheet is plated with copper.

3. The lithographic printing plate as defined by claim 1 wherein the aluminum sheet is plated with chromium.

4. The lithographic printing plate as defined by claim 2 wherein the copper plating is plated with chromium.

5. The lithographic printing plate as defined by claim 1 wherein the aluminum sheet has a photosensitive coating thereon.

6. The lithographic printing plate as defined by claim 2 wherein the copper plating has a photosensitive resist coating thereon.

7. The lithographic printing plate as defined by claim 3 wherein chromium plating has a photosensitive resist coating thereon.

8. The lithographic printing plate as defined by claim 4 wherein the chromium plating has a photosensitive resist coating thereon.

9. The lithographic printing plate as defined by claim 1 wherein the adhesive is a thermosetting polyester resin.

* * * * *